Feb. 3, 1953     H. W. MOORE     2,627,379
AUTOMATIC ARMATURE WINDING MACHINE Filed Feb. 1, 1949     7 Sheets-Sheet 1

Fig.1.

INVENTOR.
Harry W. Moore
BY Dybvig & Dybvig
His Attorneys

Patented Feb. 3, 1953

2,627,379

UNITED STATES PATENT OFFICE 2,627,379

AUTOMATIC ARMATURE WINDING MACHINE

Harry W. Moore, Dayton, Ohio

Application February 1, 1949, Serial No. 73,927

11 Claims. (Cl. 242—13)

This invention relates to an automatic armature winding machine and more particularly to an armature winding machine wherein the coils are wound successively without cutting the wire between coils during the winding operation, although not necessarily limited to an armature winding machine, in that the same principle could be incorporated in other devices in which a series of coils are being wound.

An object of this invention is to provide an automatic coil winding machine for winding the coils in the slots of an armature, wherein the coil winding operation upon the completion of one coil is momentarily interrupted while the armature is indexed, so as to place succeeding pairs of slots in registry with the wings of the coil winder, and forming a loop between successive coils without cutting the wire, and without manually manipulating the mechanism, so that the coil winding machine operates continuously until all of the slots in the armature have been wound, at which time the coil winding machine automatically stops while the wound armature is ejected and a new armature is placed in position, the wire remaining unsevered, so that the wound armature may be held together by one or more wires extending from one armature to the other, the machine being provided with mechanism for providing a slack in the wire extending from the wound armature to the armature that is being wound, so as to permit indexing of the armature without undue tension and strain in the wire or wires connecting succeeding armatures.

Another object of this invention is to provide a pawl member adapted to project into the path of the wire leaving the spinners only when the armature being wound is indexed, the pawl member moving out of the path of the spinners immediately after a loop has been provided in the wire between successive coils.

Another object of this invention is to provide a holding mechanism for holding an armature that has just been ejected from an armature winding machine, which holding mechanism provides means for slacking the wire between the armature that is being wound and the armature on which the winding has been completed, so as to permit indexing of the armature during the winding operation.

Another object of this invention is to wind a series of coils, one after the other, the winding machine causing a relative shifting of positions between the winding mechanism and the coil supports after the completion of one coil or the completion of a series of coils, which shifting takes place automatically without the attention of the attendant.

Other objects and advantages reside in the construction of parts, the combination thereof and the mode of operation, as will become more apparent from the following description.

The device disclosed herein is a pneumatically or hydraulically controlled winding machine provided with chuck members functioning as winding wings for supporting the armature or a core for the coils to be wound, which chuck is associated with an indexing mechanism for indexing the armature after each set of coils has been wound. The chuck mechanism is automatically released after each set of coils has been wound so as to permit indexing. Furthermore, the device includes a mechanism projecting into the path of the wires laid by the spinners for forming a pair of loops at the end of each pair of coils, which loops are produced by reversing the spinners for half a revolution at the same time that a pair of pawls is projected into the path of the wires laid by the spinners, to thereby form the loops. These loops may be formed either prior to or after the indexing operation.

After the loops have been formed and the armature has been properly indexed so as to cause new pairs of slots to be advanced into registry, the chucks again engage the sides of the armature preparatory to the spinners laying coils in the new slots, after which the indexing and the formation of new loops takes place, as described above. The machine is fully automatic from the time it is started until all of the coils have been wound in the proper slots in the armature, each of the coils terminating in loops at the ends, used in connecting to the riser bars of the commutator segments.

Referring to the drawings, the reference character 10 indicates the base or the support for a coil winding machine. Mounted upon the base 10 is a hollow bed 12. The bed 12 is provided with an upwardly directed portion terminating in a dove-tailed transverse guide portion 14. This guide portion 14 supports housing members 16 and 18 which are adjustably mounted for lateral movement.

Figure 2:
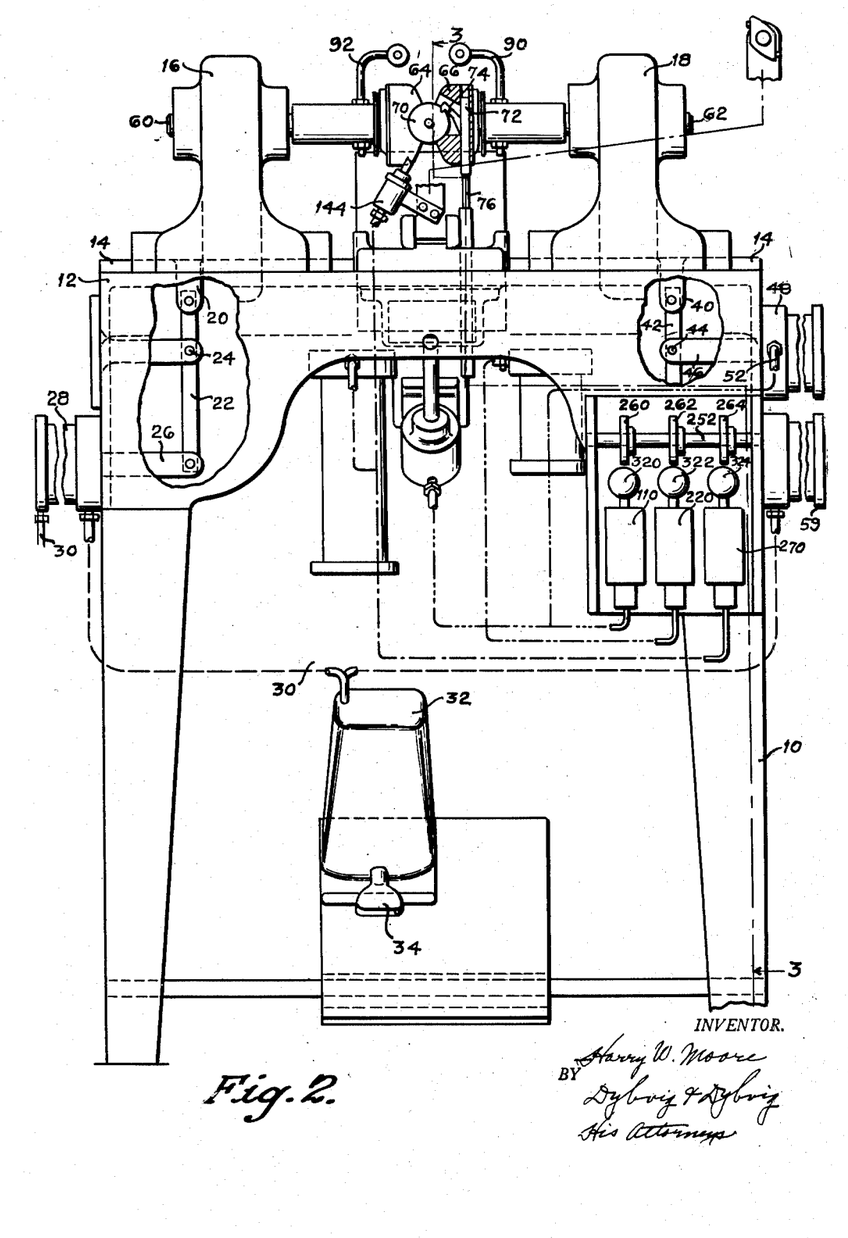
Figure 2 is a front elevational view with parts broken away and parts shown in section so as to disclose the armature indexing pawl.
Figure 13:
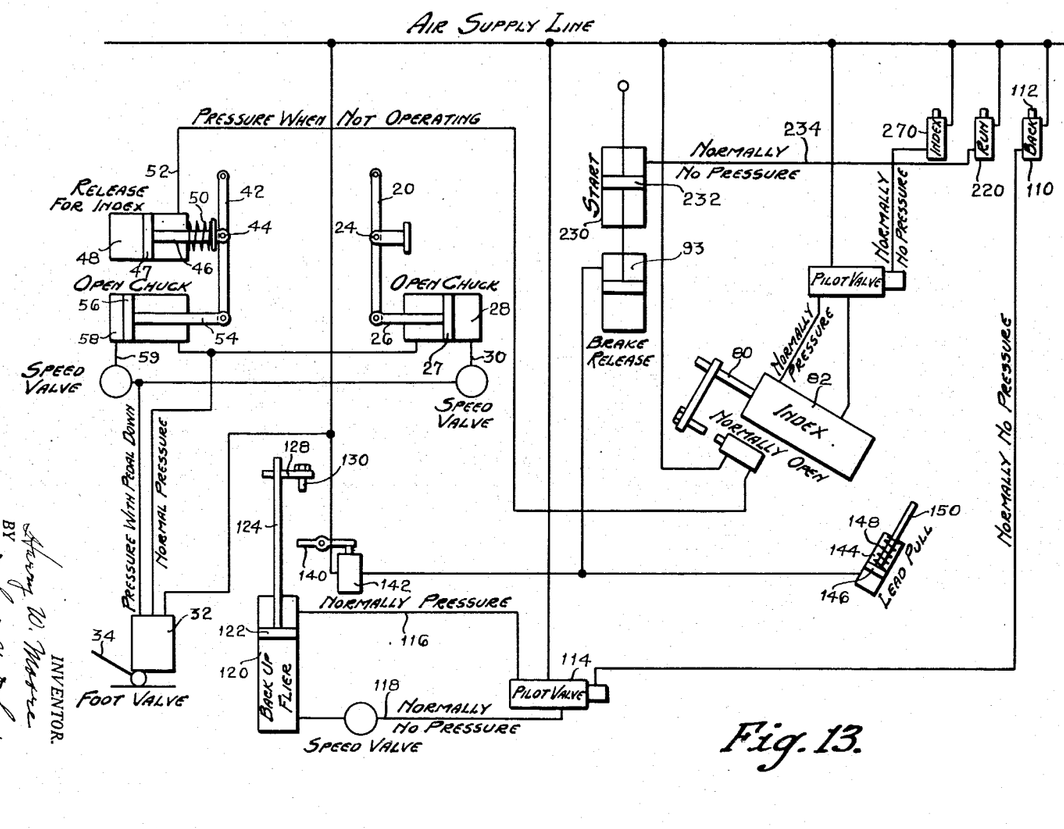
Figure 13 is a diagrammatic view of the air supply line used in pneumatically actuating the various controls of the coil winding machine.

As may best be seen by referring to Figure 2, the housing member 16 is provided with a downwardly directed lug 20 attached to a lever 22 fulcrumed at 24 and connected to a link 26, which is a piston rod attached to a piston 27 within the cylinder 28, as seen in Figure 13. The cylinder 28 is connected by a conduit 30 to a reservoir 32 having air under pressure therein, and controlled by a foot pedal 34, so that when the operator steps on the foot pedal 34, air is supplied to the cylinder 28 through the conduit 30, so as to actuate the housing member 16 to the left for reasons that will appear more fully later.

The housing member 18 is also provided with a downwardly projecting lug 40 connected to a lever 42 attached at 44 to a piston rod or link 46 attached to a piston 47 mounted in the cylinder 48. The movement of the piston rod 46 in the cylinder 48 is very small, on the order of a fraction of an inch.

As may best be seen by referring to the schematic showing in Figure 13, the piston rod 46 is normally biased to the right as viewed in Figure 13, or to the left, as viewed in Figure 2, by a compression spring 50. The cylinder 48 is connected by a conduit 52 to a source of air pressure through a suitable valve mechanism such that pressure is supplied to actuate the piston towards the left, as viewed in Figure 13, whenever the winding machine passes through the indexing portion of the cycle, as will appear more fully later. In other words, the spring 50 is effective only when the winding machine is actually winding coils, as will be described more fully later.

The lower end of the lever 42 is attached to a piston rod 54 shown in Figure 13, connected to a piston 56 in the cylinder 58. Air pressure is supplied to the cylinder 58 by means of a conduit 59 connected to the source of air pressure reservoir 32. Whenever the foot pedal 34 is pressed downwardly, air pressure is supplied to the cylinder 58 to actuate the piston 56 to the right, as viewed in Figure 13, to cause the lever 42 to pivot about the pivot 44 to actuate the housing member 18 to the left, as viewed in Figure 13 and to the right, as viewed in Figure 2.

The gear housing member 16 has a shaft 60 journalled therein. When the machine is winding an armature, the shaft 60 is rotated through a suitable driving mechanism which has not been shown. Likewise, the gear housing member 18 has a shaft 62 journalled therein, which is driven through a suitable gear mechanism not shown. Shafts 60 and 62 rotate in opposite directions. The large end of the shaft 60 supports a chuck 64, the end of the shaft being journalled in the chuck. The end of the shaft 62 supports another chuck member 66, journalled on the end thereof. The chuck members 64 and 66 do not rotate with the shafts 60 and 62. The chuck members 64 and 66 cooperate to support an armature 70 clamped therebetween.

The chuck member 66, which has been shown in section in Figure 2, supports an indexing mechanism including an actuating member 72 and a pawl 74. The pawl 74 is normally biased towards the armature 70 by a suitable spring, not shown. The indexing mechanism is actuated upwardly by means of a plunger 76, pneumatically driven, which will be described more fully later, causing the actuating member 72 to be raised and projected into the chuck member 66, thereby raising the pawl 74 to engage a succeeding winding slot in the armature. However, before this takes place, the cylinder 48 actuates the link 46, so as to separate the chucks a fraction of an inch to permit the pawl 74 to rotate the armature 70 in a clockwise direction, as viewed in Figure 2, so as to advance a new pair of slots into registry with the chuck 66 and a new pair of slots into registry with the chuck 64. As soon as the armature has been indexed, the armature is clamped in position through the action of the compression springs 50.

Figure 3:
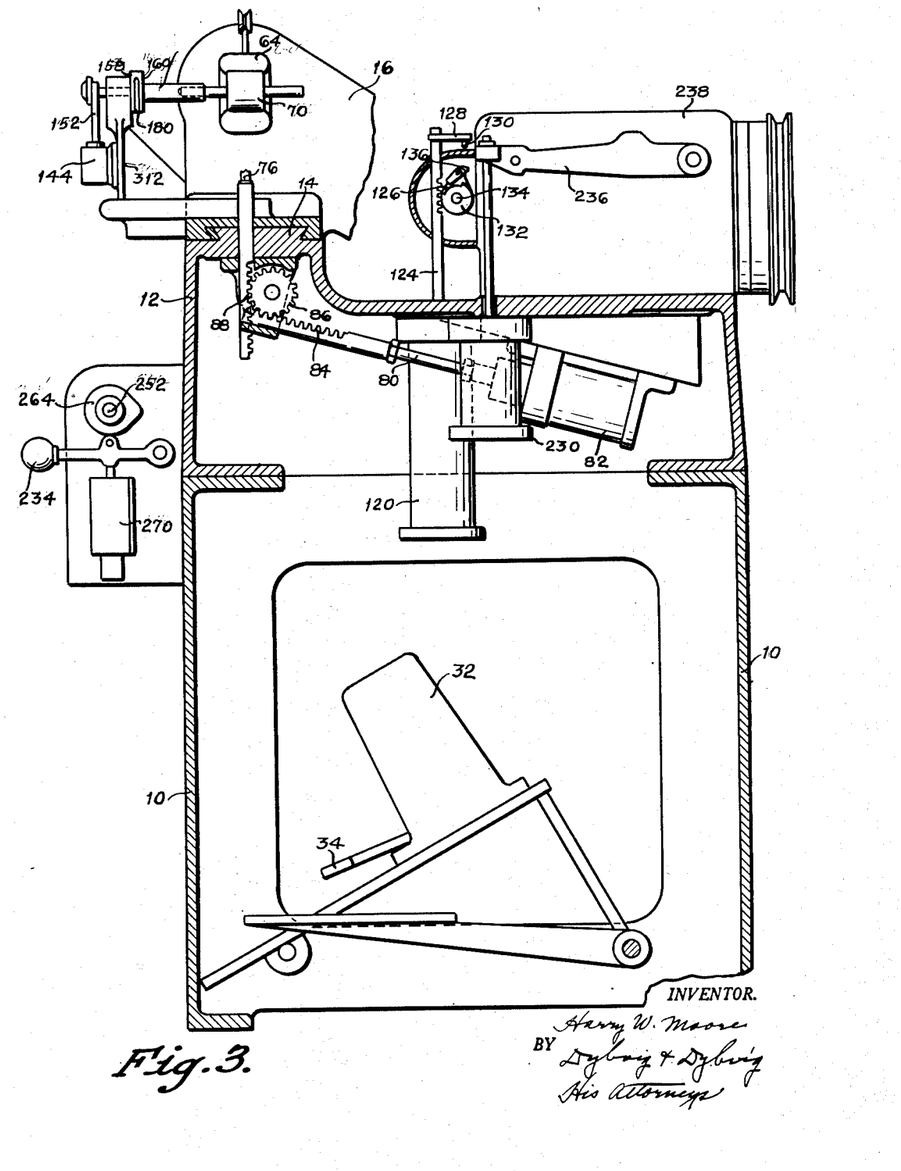
Figure 3 is a longitudinal cross sectional view taken substantially on the line 3—3 of Figure 2.

As may best be seen by referring to Figures 3 and 13, the indexing mechanism is actuated by a piston rod 80 connected to a piston located in the cylinder 82. As best seen in Figure 3, the piston rod 80 terminates in a rack 84, meshing with a pinion 86 having a width sufficient to mesh with the rack 88 fixedly attached to the plunger 76. As soon as the armature has been indexed, the piston rod 80 is actuated in the cylinder 82 into home position, so as to retract the plunger 76 to provide a clearance for rotation of a spinner 90. The indexing rod 72 of the indexing mechanism is biased into down position by a suitable spring, not shown. A spinner 92 is mounted near the end of the shaft 60.

As may best be seen by referring to Figure 1, a fly wing 94 is attached to the chuck 64 and a fly wing 96 is attached to the chuck 66, for guiding the wires, as will appear more fully later.

Figure 1:
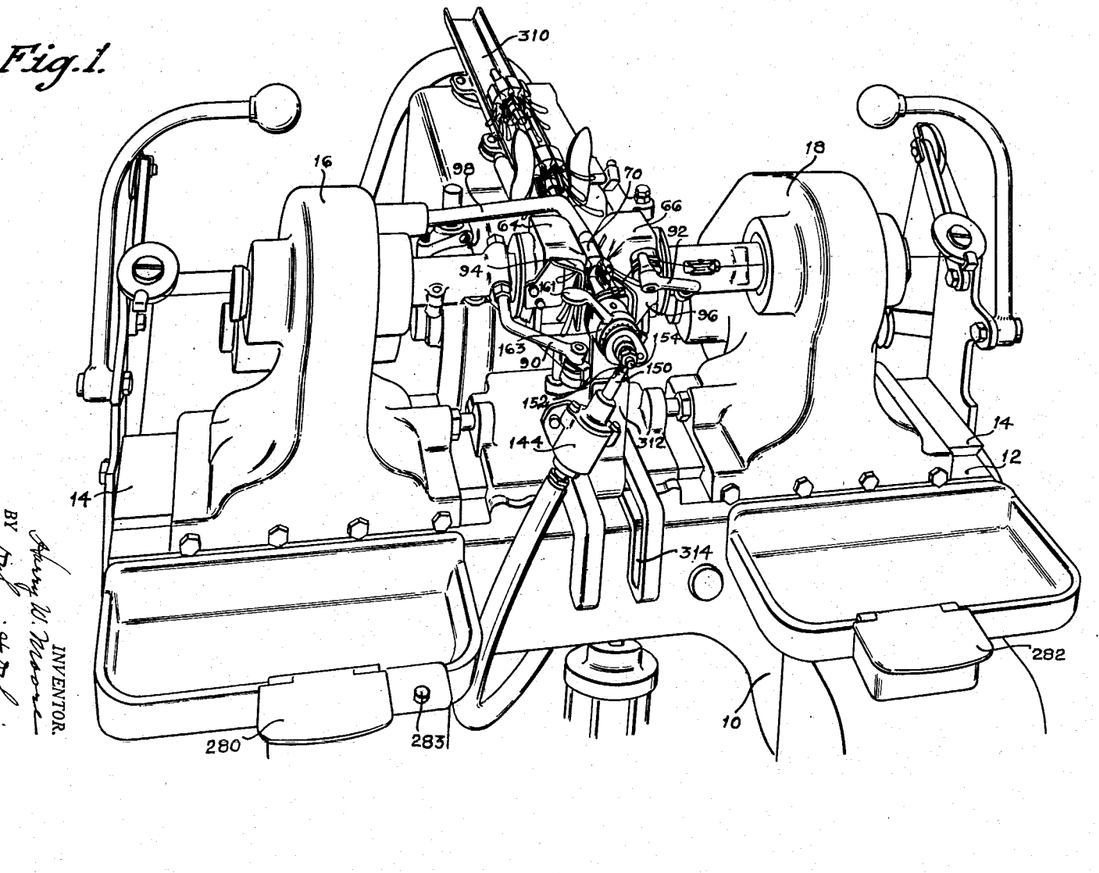
Figure 1 is a fragmentary, perspective view of an armature winding machine provided with loop-forming mechanism for forming loops between successive coils.

As may best be seen by referring to Figure 1, an L-shaped arm 98 has one end in engagement with the side of a lamination of the armature 70, so as to prevent the armature 70 from moving endwise between the chucks 64 and 66. The arm 98 is automatically raised when the chuck members are released for the purpose of reloading another armature by a suitable mechanism that has not been disclosed. The arm 98 guides the wire from the spinner into the proper slot when the winding operation is resumed after the armature has been indexed, as will appear more fully later.

When the new armature core is inserted or when a coil has been completed, it is necessary to index the armature so as to align four slots into winding position. Two of the slots on one side and adjacent one chuck member receive the windings of one coil and the other two slots adjacent the other chuck receive the windings of another coil at the same time. These windings are laid in position by the spinners 90 and 92.

The mechanism for automatically stopping the operation of the spinners after the desired number of layers have been laid in the slots to complete the coils causes the spinners to stop in a predetermined position. The spinners are shown in this position in Figure 1. The movement of the spinners is arrested in this position and held therein by the brake cylinder 93 shown in Figure 13.

During the portion of the cycle that the armature is indexed in readiness for another pair of coils to be wound, several steps in the process of winding the armature take place. Whether the loop extending from the end of the coil is formed before or after the indexing operation is optional. For some types of armatures, it is preferable to form the loop before the armature is indexed. In other types of armatures it is preferable to form the loop after the armature has been indexed. If the loops are formed before the indexing takes place, there is an extra wire laid in one slot of each completed coil which has no utility other than as a conductor having a current flowing in a direction opposite to the flow of current in the adjacent windings in the completed coil. If the loops are formed after indexing, then there is an inactive wire in the first slot of the coil to be wound. Although the indexing operation has already been described and the loop forming operation is now about to be described, the device disclosed herein has been so timed and the cycle so arranged that the loop is actually formed before the indexing takes place.

When a pair of coils has been completely wound, it is necessary to provide leads extending from the coils that have been wound and also provide leads for the new coils that are to be wound in the succeeding cycle of operation. In forming the loops, a valve 110 is opened by actuating the plunger 112 downwardly, as viewed in Figure 13. This may be done manually or automatically, as will appear more fully later. In so doing, a pilot valve 114, shown in Figure 13, releases the pressure on the conduit 116 and supplies pressure to the conduit 118, the conduits 116 and 118 being connected to opposite ends of the cylinder 120 shown in Figures 3 and 13.

In view of the fact that there is normally pressure in the conduit 116, it can readily be seen that normally the piston 122 is seated in the lower end of the cylinder 120, as viewed in Figure 13. When the pilot valve 114 is actuated in response to the opening of the valve 110, the piston rod 124 is actuated upwardly, as viewed in Figures 3 and 13. As the piston rod 124 is raised, it actuates a gear supporting a pawl 126 in a clockwise direction, as viewed in Figure 3. The piston rod 124 supports a bracket 128 provided with a downwardly directed plunger 130. When the valve 110 is again closed, the conduit 118 is de-energized, so that there is no pressure in this conduit, but instead, pressure is supplied to conduit 116, actuating the piston 122 downwardly, which causes the pawl 126 to engage a notch in member 132 keyed to a shaft 134, resulting in the shaft 134 being rotated until the downwardly directed plunger 130 engages a pawl release member 136, releasing the pawl 126 from member 132. The shaft 134, through a suitable gear mechanism not shown, actuates the spinners 90 and 92 backwards about one-half of a revolution, so as to lay a wire in the reverse direction from the direction in which the coil that has just been finished has been wound.

In order that the last wire laid into the slot shall not be unwound from the slot or retracted from the slot and in order to provide a loop for attaching the ends of the coils to the commutator riser bar, a suitable pawl mechanism has been provided which is projected into the path of the wire extending from the armature to the spinner, which mechanism will now be described.

Figures 4, 5:
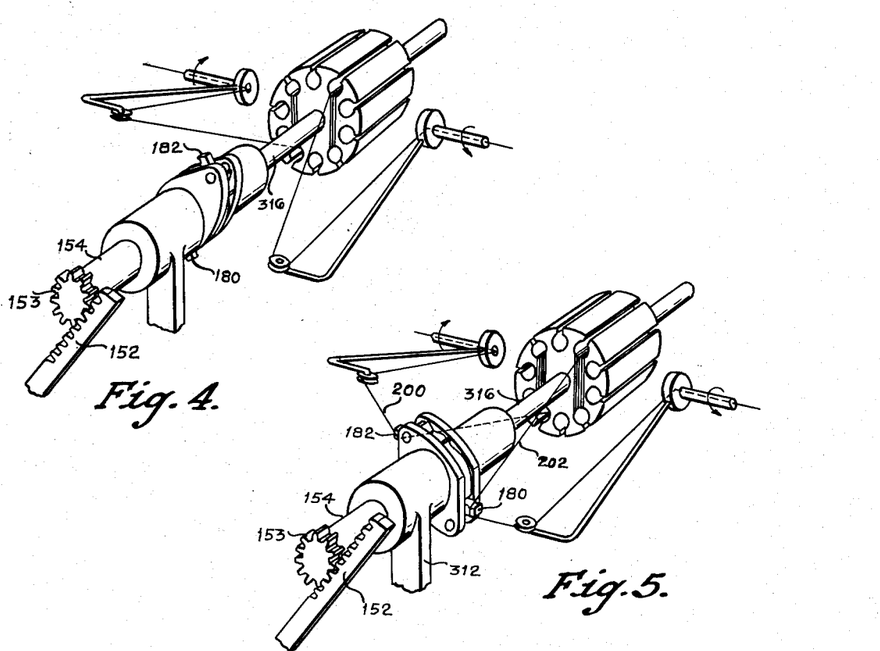
Figure 4 is a schematic, fragmentary, perspective view of the pawl mechanism for forming loops.
Figure 5 is another schematic, perspective view similar to Figure 4, disclosing the loop-forming pawl projected into loop-forming position.
Figure 6:
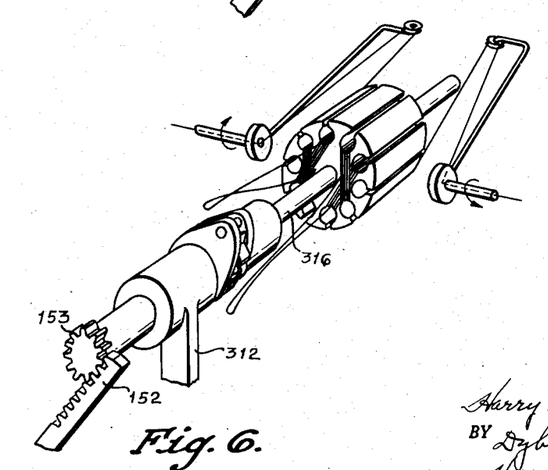
Figure 6 is another schematic, perspective view similar to Figures 4 and 5, disclosing the pawls for forming the loops in the retracted position after the loops have been formed.

When a back-up flier cylinder 120, shown in Figure 13, is supplied with a fluid pressure through the conduit 118 so as to actuate the piston rod 124 upwardly, the plunger 130 releases a lever 140 normally holding a valve 142 closed, so as to open the valve 142, to thereby supply fluid pressure to a lead pull cylinder 144, shown in Figures 2, 3 and 13. When pressure is supplied to the cylinder 144, a piston 146, which is normally held in the lower end of the cylinder 144 by a helical spring 148, is raised upwardly, as best seen in Figure 13. By supplying the pressure to the lower end of cylinder 144, as viewed in Figure 13, the piston 146 compresses the spring 148, so as to raise the piston rod 150, the upper end of which terminates in a rack 152 meshing with a pinion 153 fixedly attached to a tubular sleeve 154 by a stud 155, as best shown in Figures 4, 5 and 6.

The tubular sleeve 154 is mounted for rotation in a support 312 adjustably mounted upon the frame of the winding machine, as will appear more fully later. A set screw 157, extending through a slot 154a in the tubular member 154, threadedly engages a supporting member 156, which will be more fully described later. As may best be seen by referring to Figures 7 to 11 inclusive, the tubular sleeve 154 is fixedly attached to a pawl supporting structure consisting of members 158 and 160. A pair of pins 162 and 164 span the distance between members 158 and 160, so that these members are held in fixed spaced relation and oscillated in unison with respect to the support 312. A hand actuated lever 161, shown in Figure 1 is attached to a collar 163 mounted for oscillation with the tubular sleeve 154 and vice versa, that is, the tubular sleeve 154 may be oscillated by manually operating the handle 161.

Figures 7, 8, 9, 10:
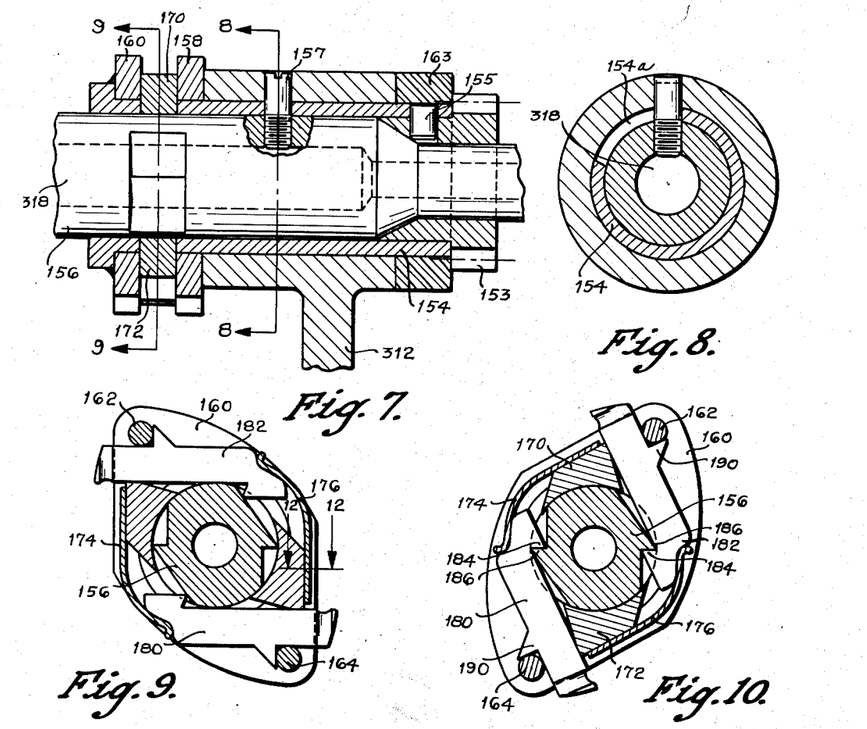
Figure 7 is a longitudinal cross sectional view of the pawl actuating mechanism.
Figure 8 is a transverse cross sectional view, taken substantially on the line 8—8 of Figure 7.
Figure 9 is a transverse cross sectional view, taken substantially on the line 9—9 of Figure 7, showing the pawls in loop-forming position.
Figure 10 is another view similar to Figure 9, wherein the pawls have been actuated into a loop-holding position.
Figure 12:
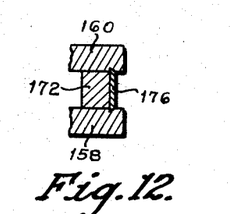
Figure 12 is a fragmentary, cross sectional view, taken substantially on the line 12—12 of Figure 9.

A pair of spacer members 170 and 172 are fixedly mounted between members 158 and 160, so that the spacer members will rotate or oscillate with members 158 and 160. A pair of leaf springs 174 and 176 rest upon spacer members 170 and 172 and are fixedly mounted in suitable notches provided therefor in members 158 and 160, as best seen in Figure 12. The outer ends of the leaf springs 174 and 176 are curved and are seated in suitable recesses near the ends of the pawl members 180 and 182. The pawl members 180 and 182 have each been provided with a detent 184, adapted for a portion of a cycle to engage detents 186 in the stationary supporting member 156. The pawl members 180 and 182 are each provided with a projection 190 functioning as a stop engaging the pins 162 and 164, so as to limit the outward thrust of the pawl members 180 and 182, which are biased to the outward position by the leaf springs 174 and 176, as shown in Figures 9 and 10. As the rack 152, integral with the piston rod 150, is raised upwardly from the position shown in Figure 6 to the position shown in Figure 5, members 158 and 160 are rotated in a counterclockwise direction from the position shown in Figure 10 to the position shown in Figure 9.

In passing from the position shown in Figure 9 to the one shown in Figure 10, the detent 186 engages the detent 184, so as to retard the rotation of the pawls 180 and 182, the springs 174 and 176 yielding. This causes the pawls 180 and 182 to be retracted so as to be positioned between members 158 and 160, thereby stripping the previously formed loops from the pawls 180 and 182. As may be clearly seen by referring to Figure 11, the normally outwardly projecting ends of the pawls 180 and 182 are retracted so as to lie wholly between members 158 and 160. Members 158 and 160 continue to rotate about the fixed supporting member 156. The pins 162 and 164, generating arcs of a circle, lift the detents 184 out of engagement with the detents 186. As soon as the detents 184 disengage the detents 186, the pawl members 180 and 182 are snapped outwardly by the leaf springs 174 and 176 into the position shown in Figure 9. The pawls are arrested in their outward movement by the projections 190 engaging the pins 162 and 164.

After the pawl members 180 and 182, together with members 158 and 160 have been projected outwardly into the substantially horizontal position, as viewed in Figure 9, the spinners or fliers 90 and 92 are turned backward half a revolution, so that the wires 200 and 202 are hooked upon the pawl members 182 and 180 respectively, as shown schematically in Figure 5. As soon as the cylinder 144 is de-energized, the spring 148 actuates the piston 146 downwardly, so as to retract the rack 152 from the position shown in Figure 5 to the position shown in Figures 4 and 6, thereby rotating members 158 and 160 from the position shown in Figure 9 to that shown in Figure 10. The loop in the wires 200 and 202 are thereby actuated out of the path of the spinners or fliers 90 and 92. These loops are held in this position until the next pair of coils have been wound. The armature is then ready to be indexed. The indexing operation of the armature has been previously described.

After the armature has been indexed so as to present new slots in winding position, the valve 220 is opened, causing the cylinder 230 provided with a piston rod 232 to be actuated upwardly, as viewed in Figure 13, by the release of the pressure in the conduit 234, causing the clutch lever 236, shown in Figure 3, to be actuated upwardly, releasing the brake holding the operating mechanism in locked position and for engaging a clutch, not shown, mounted within the housing 238, so as to drive the spinners or fliers to wind another coil. The clutch is biased into clutch engaging position by a spring, not shown, which spring also biases the clutch lever 236 upwardly as viewed in Figure 3. These operations are repeated cyclically until all of the slots of the armature have been wound.

Figure 14:
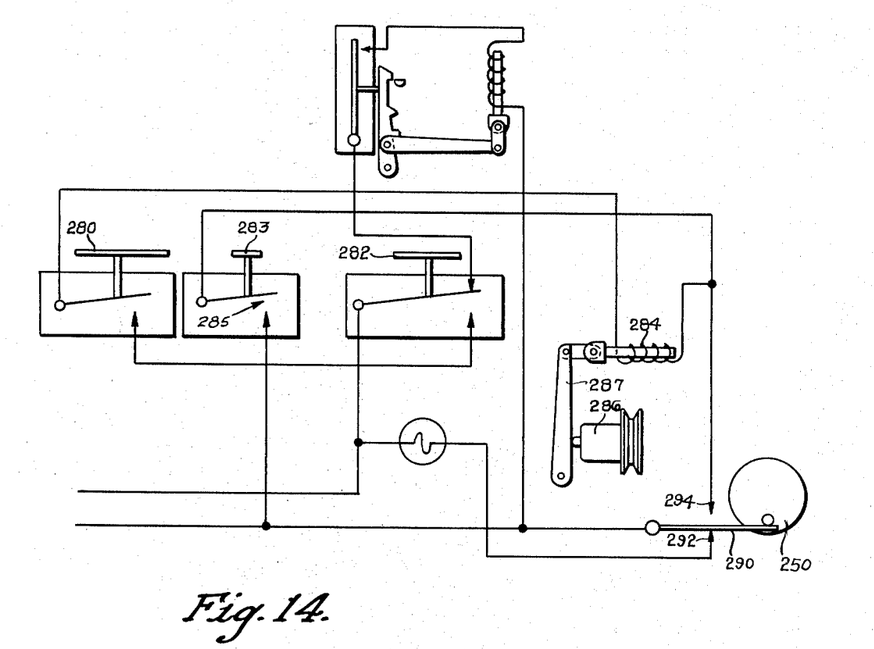
Figure 14 is a schematic wiring diagram of the electrical system used in controlling the coil winding machine.

In order to provide a winding machine that is fully automatic from the time an armature is first inserted until all of the slots have been supplied with the proper windings, an automatic control mechanism has been provided, shown schematically in part in Figure 14.

The driving mechanism for actuating the winding machine actuates a disc 250 shown in Figure 14, which makes one revolution during the time that is required to wind all the coils in position required for an armature. A shaft 252, shown in Figures 2 and 3 makes a predetermined number of revolutions when the disc 250 makes one revolution. If, for example, ten coils are required for an armature, five being wound by each of the spinners, the shaft 252 would then make five revolutions when the disc 250 makes one revolution. This has been accomplished by means of the interconnecting driving mechanism, not shown. This interconnecting driving mechanism may be any suitable type of driving mechanism, as for example, gears arranged to be changed to get various speed ratios between the discs 250 and the shaft 252. The shaft 252 has mounted thereon three cams 260, 262 and 264, adapted to engage and actuate in proper sequence the valves 110, 220 and 270. From this it can readily be seen that by properly selecting and timing the various cams, the valves 110, 220 and 270 can be actuated so as to carry out all of the operations required to completely wind an armature.

The cam 262 actuates the valve 220 at the completion of the winding operation of each pair of coils, so as to cause the cylinder 230 to actuate the lever 236, shown in Figure 3, downwardly or in a counterclockwise direction so as to release the clutch connecting the driving mechanism to the prime mover, thereby interrupting the rotation of the spinners and applying a brake to the driving mechanism to stop the spinners in a predetermined position. As the shaft 252 rotates, the cam 262 opens the valve 220 to release the fluid supplied to the cylinder 230 to again permit the compression spring, not shown, to actuate the clutch members into clutch engaging position and at the same time release the brake to again initiate the rotation of the spinners to wind a pair of succeeding coils.

By referring to the wiring diagram shown in Figure 14, it is to be noted that it is necessary for the operator to actuate the switches 280 and 282 simultaneously and to momentarily press the push button 283 to close the switch 285 in order to energize the relay 284 actuating the clutch-actuating lever 287. By so doing, clutch 286 is engaged, thereby connecting the winding machine to the prime mover. It can readily be seen that as the disc 250 rotates a short distance, the switch arm 290 disengages the fixed contact 292 and snaps into engagement with the fixed contact 294. When the switch arm 290 snaps into contact with the fixed contact 294, the starter switch 285 may then be released, the operator maintaining the switches 280 and 282 closed.

By referring to Figure 1, it can readily be seen that the switch 282 is located on one side of the machine and the switch 280 on the opposite side of the machine. The push button 283 is located adjacent the switch 280, so that by pressing upon the switch 280, the operator can press upon the push button 283 with the thumb of his left hand while actuating the switch 282 with his right hand. It is necessary for the operator to press on the switches 280 and 282 during the winding operation. Releasing the hand from either one of these switches interrupts the operation of the machine by deenergizing the relay 284. The reason for this requirement is to keep both hands of the operator occupied when the winding machine is operating, to thereby prevent the operator from getting his hands injured by the winding machine.

When an armature has been completely wound, the operator steps on the foot pedal 34 shown in Figures 2 and 3, which supplies pressure to the left end of the cylinder 59 and to the right end of cylinder 28, so as to actuate the housing 16 to the left and actuate the housing 18 to the right, as viewed in Figure 2, to thereby separate the chuck members 64 and 66 a distance sufficiently far to permit the armature 70 mounted in winding position to be removed rearwardly into the chute 310, as best seen in Figure 1, the two wires from the spinners remaining connected. The support 312 for supporting the lead pull mechanism is then actuated forwardly, as viewed in Figure 1, through the guide slots 314, so as to permit insertion of a new armature between the chuck members 64 and 66.

After a new armature has been positioned, member 98 is dropped into contact with one edge of the armature and the support 312 is brought back into the home position shown in Figure 1, with the armature shaft 316 projecting into the recess 318 in member 156. The foot pedal 34 is then released, so as to cause the chuck members to grip the sides of the armature. The armature shaft projecting into a recess provided therefor in member 156 prevents the chucks from rotating with the supporting shafts. Before beginning the winding operation, the armature is first indexed and a loop is formed extending from the pawls 180 and 182, so as to provide a terminal for the leading ends of the first coils to be wound. It is to be noted that a wire extends through the first slot of the armature from the previous armature, which wire has no utility other than for the purpose of winding the armature. In other words, a dead end wire remains in the first slot on each side.

In the event it is found desirable for the operator to control the winding machine for any reason whatsoever, he may do so. As best shown in Figures 2 and 3, hand control levers 320, 322 and 324 are associated with the switches 119, 220 and 279 respectively. These control levers are located between the switches and the cams 260, 262 and 264.

Figure 11:
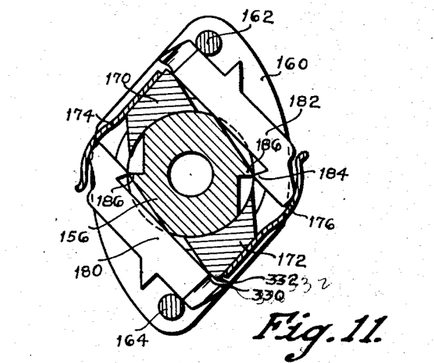
Figure 11 is another cross sectional view similar to Figures 9 and 10, disclosing the pawls in retracted position, wherein the pawls have released the loops.

By providing members 158 and 160 with suitable clearances so as not to shed the loop and by retracting the pawls 180 rearwardly, as viewed in Figure 11, so as to cause the edge 330 of each to engage the edge 332 of each of the members 170 and 172, the edges 330 and 332 would then function as cutting tools or as shears for cutting the wire forming the loop. Thus, the ends of the coils forming the loops would be severed in readiness to be attached to the riser bars or commutator tangs.

As far as the operation of the machine is concerned, it is immaterial whether one or two spinners are used. Two spinners have been shown for the reason that for some types of armatures two spinners may be used, thereby reducing the time required for winding each armature.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A coil winding machine for winding a slotted armature, said coil winding machine including a pair of chuck members for holding the armature in winding position, a pair of spinner members for laying a pair of wires in two pairs of armature slots to simultaneously form a pair of armature coils, a pair of pawls projecting into the path of the wires, there being one pawl for each spinner member so as to form a loop between adjacent ends of adjacent coils wound by the same spinner member, supporting means for supporting the pawls, said supporting means including a pair of parallel frame members, spacer members for holding the parallel frame members in spaced relation, the pawls resting upon the spacer members, a concentrically disposed supporting member for supporting the frame members and having detents, resilient means for urging the pawls into contact with the detents, and means for oscillating the frame members upon the concentrically disposed member to thereby cause a relative movement between the frame members and the pawls to project the pawls into the path of the wires and for withdrawing the pawls from the path of the wires.

2. A coil winding machine for use in winding a slotted armature, including a pair of chuck members for holding a slotted armature in winding position, a pair of spinner members for laying a pair of wires in two pairs of armature slots to simultaneously form a pair of armature coils, means for indexing the armature upon the completion of each pair of coils, a pair of pawls projecting into the paths of the wires, there being one pawl for each spinner member so as to form a pair of loops one at the end of each coil that has been wound and the adjacent coil to be wound, means for supporting and actuating the pawls, said means including a pair of frame members, a pair of spacer members mounted between the frame members, a concentrically disposed supporting member having detents, said frame members being mounted for oscillatory movement on said concentrically disposed member, the pawls being mounted between the frame members and resting upon the spacer members, resilient means for urging the pawls into contact with the detents, means for actuating the frame members and the spacer members to thereby cause relative movement of the pawls engaging the detents with respect to the frame members and the spacer members, and means for actuating the indexing means so as to position two other pairs of slots in coil winding position.

3. A coil winding machine for use in winding a slotted armature, including chuck members for holding the armature in position, the chuck members functioning as wings guiding the wire used in forming the coils into the slots, spinner members for laying the wire in the slots, means for indexing the armature upon the completion of each set of coils, a pair of means for forming loops, each of said last mentioned means forming a loop at the end of each completed coil and the succeeding coil wound by the same spinner member, said pair of means including a pair of pawls one for each of the spinner members, said pawls projecting into the paths of the wires emanating from the spinner members, means driven in synchronism with the spinner members and projecting and withdrawing each pawl into and out of the path of the respective wires at the completion of the winding of a pair of coils, each of said pawls when projecting into the path of the wire forming a loop at the end of a wound coil and the succeeding coil wound by the same spinner member, and means for retracting the pawls from the paths of the wires after the loops have been formed to permit the spinner members to wind the succeeding pair of coils.

4. A coil winding machine for use in winding a slotted armature including chuck members for holding the armature in position, the chuck members functioning as wings guiding the wires used in forming the coils into the slots, spinner members for laying the wires in the slots, means for indexing the armature upon the completion of each set of coils, means for engaging the wires upon each set of coils, said last mentioned means including pawls projecting into the paths of the wires emanating from the spinner members, means including a cam driven in synchronism with the spinner members, a fluid driven means controlled by the cam for projecting the pawls into the paths of the wires at the completion of the winding of a set of coils, and means for reversing the spinner members through 180° when the pawls are projected into the paths of the wires to thereby form loops, said cam and said fluid driven means retracting the pawls from the paths of the wires after the loops have been formed.

5. A coil winding machine for winding a slotted armature, said coil winding machine including means for holding the slotted armature in winding position, means for laying the wire used in forming the windings in the slots of the armature, means for causing a relative rotary movement between the means for holding the armature and the means for laying the wire to cause the wire to be laid into the slots to form the armature windings, means for arresting the relative rotary movement in a predetermined relative position, a pawl member projecting into the path of the wire, means including a cam, a cam follower, and fluid driven means, said cam being driven in synchronism with the means for laying the wire for projecting and withdrawing the pawl member into and out of the path of the wire at the completion of the winding of a coil, and means for causing a relative movement between the holding means and the wire laying means in a reverse direction so as to form a loop at the end of a winding forming a coil.

6. A coil winding machine for winding a slotted armature, said coil winding machine including means for holding the slotted armature in winding position, a spinner member for laying the wire in a pair of armature slots to form a coil, means for rotating the spinner member, means for arresting the spinner member in a predetermined position, means including a pawl projecting into the path of the wire, means responsive to the movement of the spinner member for projecting and withdrawing the pawl into and out of the path of the wire at the completion of the winding of a coil, and means for reversing the spinner member through a portion of a revolution so as to cause the means projecting into the path of the wire to engage the wire to form a loop and so as to lay a wire in the slot in reverse direction of the completed coil, said last mentioned means including a shaft rotating in synchronism with the spinner member, a notched member fixedly mounted upon the shaft, a fluid actuated piston, and a pawl attached to the piston and engaging the notch in the notched member for rotating the shaft through a fraction of a revolution when the piston is actuated in one direction, the shaft reversing the spinner member through a fraction of a revolution.

7. A coil winding machine for winding a slotted armature, said coil winding machine including means for holding the slotted armature in winding position, a spinner member for laying the wire in a pair of armature slots to form a coil, means for rotating the spinner member, means for arresting the movement of the spinner member in a predetermined position upon the completion of a coil, brake means for holding the spinner member in arrested position, means including a pawl projecting into the path of the wire, means responsive to the movement of the spinner member for projecting and withdrawing the pawl into and out of the path of the wire at the completion of the winding of a coil, and means for releasing the brake means and reversing the spinner member through substantially half of a revolution so as to form a loop at the end of the coil, said last mentioned means including a shaft rotating in synchronism with the spinner member, a notched member fixedly mounted upon the shaft, a fluid actuated piston, and a pawl attached to the piston and engaging the notch in the notched member for rotating the shaft through a fraction of a revolution when the piston is actuated in one direction, the shaft reversing the spinner member through a fraction of a revolution.

8. A coil winding machine for winding a slotted armature, said coil winding machine including means for holding the slotted armature in winding position, a spinner member for laying the wire in a pair of armature slots to form a coil, means for rotating the spinner member, means for arresting the movement of the spinner member in a predetermined position upon the completion of a coil, said last mentioned means including a cam, means projecting into the path of the wire immediately after the completion of a coil, said last mentioned means including a cam driven in synchronism with the spinner member, and means for reversing the direction of rotation of the spinner member so as to form a loop at the end of the completed coil, said last mentioned means including a shaft rotating in synchronism with the spinner member, a notched member fixedly mounted upon the shaft, a fluid actuated piston, and a pawl attached to the piston and engaging the notch in the notched member for rotating the shaft through a fraction of a revolution when the piston is actuated in one direction, the shaft reversing the spinner member through a fraction of a revolution.

9. A coil winding machine for winding a slotted armature, said coil winding machine including means for holding the slotted armature in winding position, a spinner member for laying the wire in a pair of armature slots to form a coil, means for rotating the spinner member, means for arresting the movement of the spinner member in a predetermined position upon the completion of a coil, said last mentioned means including a cam, means projecting into the path of the wire immediately after the completion of a coil, said last mentioned means including a cam driven in synchronism with the spinner member, means for reversing the direction of rotation of the spinner member so as to form a loop at the end of the completed coil, said last mentioned means including a shaft rotating in synchronism with the spinner member, a notched member fixedly mounted upon the shaft, a fluid actuated piston, and a pawl attached to the piston and engaging the notch in the notched member for rotating the shaft through a fraction of a revolution when the piston is actuated in one direction, the shaft reversing the spinner member through a fraction of a revolution, and means for indexing the armature upon the coil being completed, said last mentioned means including a cam, and a fluid drive system, said fluid drive system including a valve, a cylinder, a piston, and a link mechanism for connecting the piston to a pawl engaging a slot so that as the piston is actuated in one direction the armature is indexed.

10. A coil winding machine for winding a slotted armature, said coil winding machine including means for holding the slotted armature in winding position, means for laying a pair of wires used in forming a pair of windings in the slots of the armature, means for causing a relative rotary movement between the means for holding the armature and the means for laying the wires to cause the wires to be laid into the slots to form the armature windings, a pair of pawl members projecting into the path of the wires for forming a pair of loops one for each coil, cam means driven in synchronism with the means for laying a pair of wires for projecting the pawl members into the path of the wires and for retracting the pawl members out of the path of the wires at the completion of the laying of a pair of coils, and means for cutting the loops to remove the loops from the pawl members.

11. A coil winding machine for winding a slotted armature, said coil winding machine including means for holding the slotted armature in winding position, means for laying the wire used in forming the windings in the slots of the armature, means for causing a relative rotary movement between the means for holding the armature and the means for laying the wire to cause the wire to be laid into the slots to form the armature windings, a pawl member, and means driven in synchronism with the means for laying the wire for effecting a relative movement between the wire laying means and the pawl member so as to cause the path of the wire to overlap the pawl member to form a loop.

HARRY W. MOORE.

REFERENCES CITED

The following references are of record in the file of this patent:

UNITED STATES PATENTS

| Number | Name | Date |
|---|---|---|
| 1,307,620 | Crane | June 24, 1919 |
| 1,871,970 | Emmert | Aug. 16, 1932 |
| 1,890,111 | Eaton | Dec. 6, 1932 |
| 2,348,948 | Allen | May 16, 1944 |